S. E. DERBY.
VALVE STRUCTURE.
APPLICATION FILED JUNE 11, 1919.

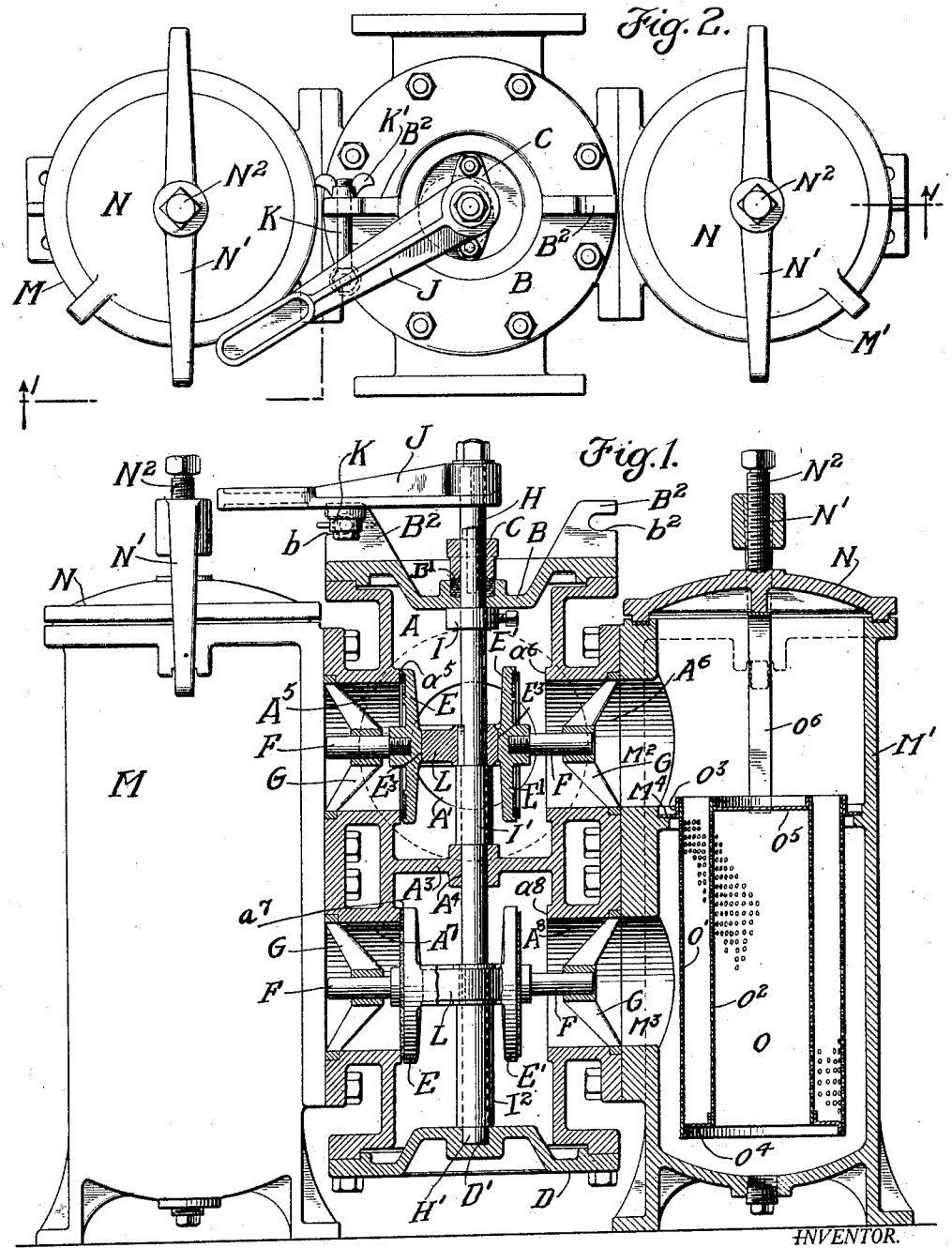

1,400,424.

Patented Dec. 13, 1921.
2 SHEETS—SHEET 2.

INVENTOR.
Samuel Ernest Derby
BY
Francis L. Chambers
ATTORNEY.

UNITED STATES PATENT OFFICE.

SAMUEL ERNEST DERBY, OF PHILADELPHIA, PENNSYLVANIA, ASSIGNOR TO SCHUTTE & KOERTING COMPANY, OF PHILADELPHIA, PENNSYLVANIA, A CORPORATION OF PENNSYLVANIA.

VALVE STRUCTURE.

1,400,424.   Specification of Letters Patent.   Patented Dec. 13, 1921.

Application filed June 11, 1919. Serial No. 303,350.

*To all whom it may concern:*

Be it known that I, SAMUEL ERNEST DERBY, a citizen of the United States of America, residing in the city and county of Philadelphia, in the State of Pennsylvania, have invented certain new and useful Improvements in Valve Structures, of which the following is a true and exact description, reference being had to the accompanying drawings, which form a part thereof.

My invention relates to an improved valve structure and in its broader features has for its object to provide a valve structure designed to perform the functions of the ordinary three-way valves, but with provisions for larger port openings, greater ease and quickness of operation, and less tendency to leakage than is ordinarily procurable by constructions in use.

The nature of my improvements will be best understood as described in connection with the drawings in which—

Figure 1 is a front elevation through a duplex strainer construction provided with my improved valve structure, said elevation being partly in section on the line 1—1 of Fig. 2.

Fig. 2 is a plan view of the structure shown in Fig. 1.

Figure 5:
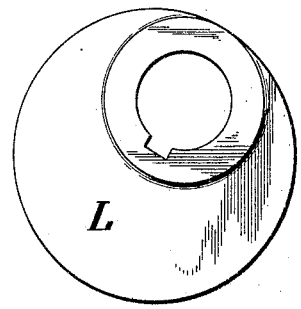
Fig. 5 is a plan view of one of the cams used in actuating the valves.
Figure 3:
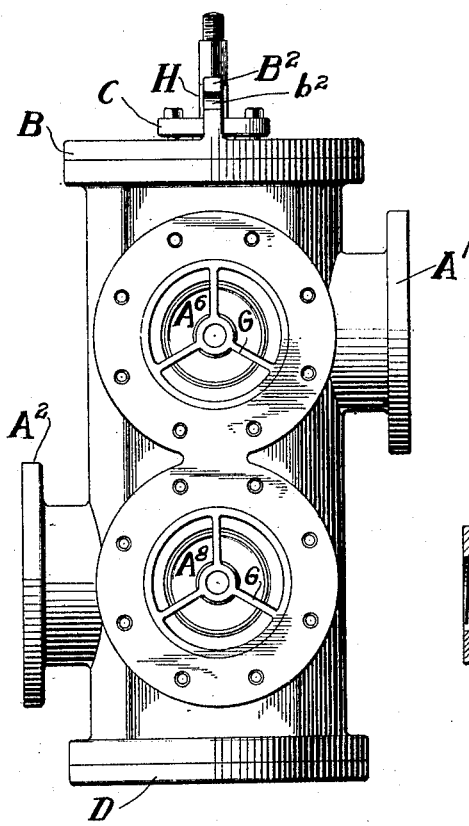
Fig. 3 is a side elevation of the valve chamber with the strainer chamber on the right hand side of Fig. 1 removed.
Figure 4:
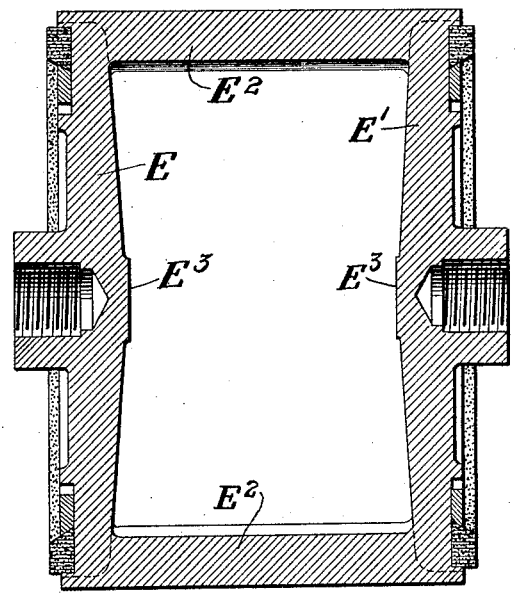
Fig. 4 is a central sectional view of one of the double valves employed in my valve structure.

A is a chamber casing having an open port A′, through which fluid can flow into the chamber. The casing is divided into an upper and lower chamber by the partition $A^3$, and the lower chamber is provided with a port $A^2$ for the outflow of fluid. The partition $A^3$ is formed, as shown, with a central perforation $A^4$ which will fit tightly and serve as a bearing for the valve shaft to be described. $A^5$ and $A^6$ are ports leading from the upper chamber of the casing, each terminating within the casing in valve seats $a^5$ and $a^6$. $A^7$ and $A^8$ are similar ports leading into the lower chamber of the casing and formed with valve seats $a^7$ and $a^8$. The valve seats $a^5$ and $a^6$ are directly opposite to and parallel with each other and with the center line of the casing, and this is also the case with regard to the seats $a^7$ and $a^8$. B is a head closing the top of the chamber A; it is formed with a central perforation for the valve actuating shaft and with packing chamber B′ in connection with which works a gland C. The head, as shown, is also formed with upwardly projecting ears $B^2$, $B^2$ in which are formed the outwardly opening slots $b^2$. D is the head closing the lower part of the chamber casing formed with a central socket D′ for the lower end of the valve actuating shaft. E and E′ are valves adapted to seat themselves on the valve seats $a^5$, $a^6$ or $a^7$, $a^8$, the valves being opposite and parallel to each other and held in rigid relation to each other by the connecting bars $E^2$, $E^2$. On the back of each valve is a cam contacting surface indicated at $E^3$. The valves are held in alinement with the valve seats by pins F, F secured to the face of each valve, and each working in a spider indicated at G. H is the valve actuating shaft which extends through the central perforation in the head B and is centered in the socket D′ of the lower head D. As shown, the shaft H is provided with an adjustable collar I which fits against the lower side of the head B, and is also provided with sleeves I′ and $I^2$, the first of which rests on the partition $A^3$, and the latter of which rests on the head D, and which serve to support and properly aline the cams indicated at L, L. J is a lever secured to the top of the shaft H and having pivotally attached to it a bolt K in alinement with the slots $b^2$ on the ears $B^2$, K′ indicating a thumb nut on the end of the bolt K. L, L are cams secured on the shaft H and in contact with the cam abutments $E^3$ of the oppositely disposed valves.

M and M′ are strainer casings secured on opposite sides of the chamber A and formed with ports $M^2$ and $M^3$, which register with the upper and lower ports leading from and to the casing A. These strainer casings are, as shown, formed with shoulders $M^4$ to support the strainer. N, N are heads for closing the top of the chambers M and M′, and, as shown, held in place by a claw N′, the ends of which fit into ears on each side of the casing, and which are provided with screws $N^2$, which bear down on the heads and hold them in place. O indicates the strainer, which, as shown, is made up of two concentric perforated cylinders of metal indicated at $O^7$ and $O^2$. The strainer is provided with an annular flange $O^3$ which rests on the shoulder $M^4$, and the concentric shoulders are secured together at bottom by the annular plate $O^4$ and the inner cylinder closed at top by the circular plate $O^5$. $O^6$ indicates a rod extending up from the plate $O^5$ which can abut, or approximately abut, against the head N, and which serves as a convenient handle for removing and replacing the strainer in the casing.

While my valve structure is well adapted for use in a duplex strainer of the construction shown it is also adapted for many other uses and the strainer attachments form no essential part of my invention. In operation, the parts being in the position shown in Fig. 1, fluid enters the upper chamber of the casing A through the port $A'$, and passes from this chamber through the port $A^6$ into the strainer casing at the right hand side, and thence passes through the port $A^8$ into the lower chamber of the casing A and thence through the open port $A^2$. When it is desired to shift the flow of fluid through the port $A^5$ and back through the port $A^7$ the shaft H is turned through the handle J. The cams L, L acting on the cam contacting surfaces of the valves E and $E'$ carries the valve E away from its seat $a^5$ and places the valve $E'$ against its seat $a^6$, closing the ports $A^6$ and $A^8$ and opening the ports $A^5$ and $A^7$, and as a means for holding the valves tightly against their seats I provide the swing bolt K which is swung into one of the slotted ears $B^2$ and clamped into position by the thumb nut $K'$.

Having now described my invention, what I claim as new and desire to secure by Letters Patent, is:

1. In combination with two chambers, one having an inlet and the other an outlet passage for fluids, and each chamber having in addition oppositely disposed ported valve seats, valves located in each chamber for co-acting with said valve seats, each pair of valves being secured together so as to move simultaneously to close one and open the other valve seat, means for supporting said valves in alinement with the valve seats, a rotatable shaft extending through the two chambers of the casing and means actuated by said shaft for simultaneously actuating the two pairs of connected valves in the same direction.

2. In combination with two chambers, one having an inlet and the other an outlet passage for fluids, and each chamber having in addition oppositely disposed ported valve seats, valves located in each chamber for co-acting with said valve seats, each pair of valves being secured together so as to move simultaneously to close one and open the other valve seat, means for supporting said valves in alinement with the valve seats, a rotatable shaft extending through the two chambers of the casing and means actuated by said shaft for simultaneously actuating the two pairs of connected valves in the same direction.

3. In combination with two chambers, one having an inlet and the other an outlet passage for fluids, and each chamber having in addition oppositely disposed ported valve seats, valves located in each chamber for co-acting with said valve seats, each pair of valves being secured together so as to move simultaneously to close one and open the other valve seat, means for supporting said valves in alinement with the valve seats, a rotatable shaft extending through the two chambers of the casing and cams attached to said shaft for simultaneously actuating the two pairs of connected valves in the same direction.

SAMUEL ERNEST DERBY.